March 2, 1965 R. A. HARRIS 3,171,535
BELT CONVEYOR FOR TRANSPORTING ELECTRICAL COMPONENTS
Filed Jan. 12, 1962 2 Sheets-Sheet 1
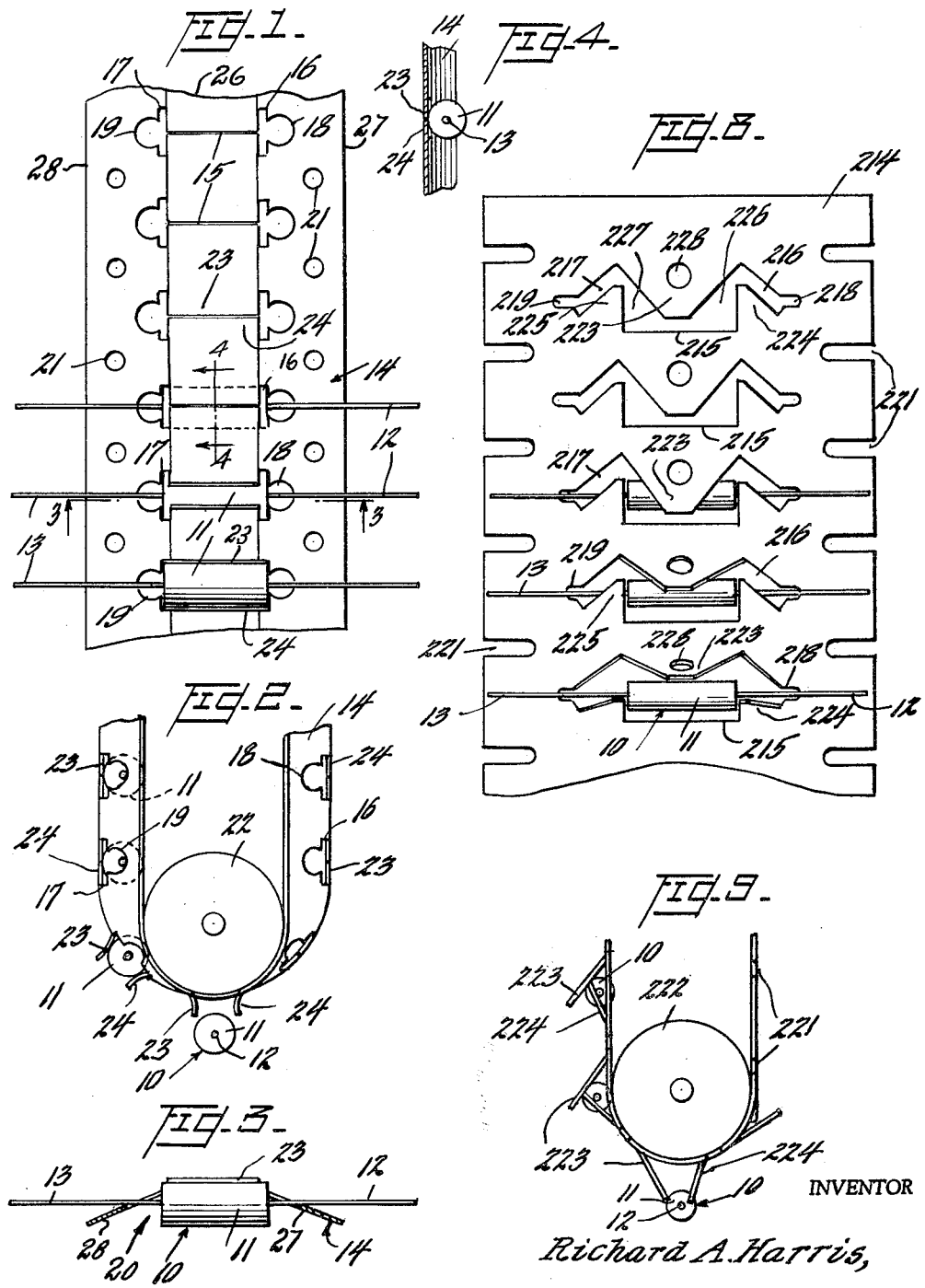
INVENTOR
Richard A. Harris,
BY R. P. Miller
ATTORNEY

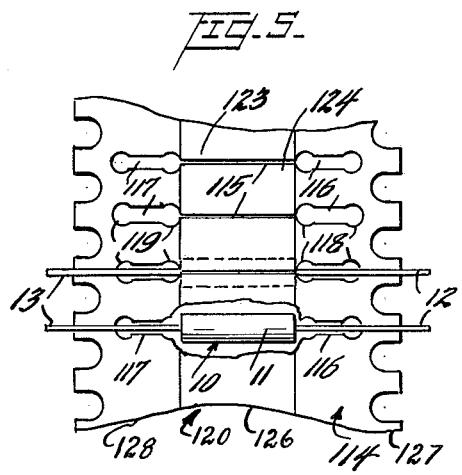
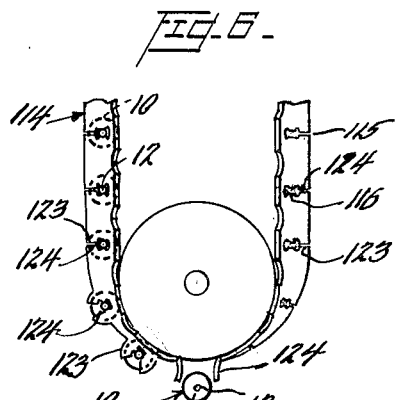
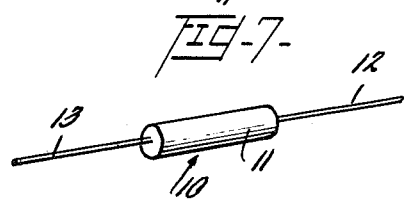

United States Patent Office 3,171,535
Patented Mar. 2, 1965

3,171,535
BELT CONVEYOR FOR TRANSPORTING
ELECTRICAL COMPONENTS
Richard A. Harris, High Point, N.C., assignor to Western
Electric Company, Incorporated, New York, N.Y., a
corporation of New York
Filed Jan. 12, 1962, Ser. No. 166,468
9 Claims. (Cl. 198—131)

This invention relates to a belt conveyor for transporting electrical components and more particularly to a flexible belt conveyor that has compartments for carrying the components in spaced relation and provisions for receiving and ejecting the components.

In the mass production of electrical units, automatic fabricating machines, such as wire wrapping machines, are employed. It is necessary to provide automatic feeding mechanisms to convey electrical components in spaced relation to the wrapping machines. These mechanisms have employed various forms of belts that convey electrical components in spaced relation, but none have performed satisfactorily. In order for efficient mass production of electrical units, it is necessary that a simple, inexpensive belt conveyor be provided for positively transporting electrical components in spaced relation. This belt should be easy to fabricate, durable and reusable.

It is a first object of the present invention to provide a simple, inexpensive flexible belt conveyor for transporting electrical components in spaced relation. It is another object of the present invention to provide a flexible belt conveyor having spaced tabs formed in the belt for holding electrical components.

It is a further object of the invention to provide a belt conveyor having facilities to overlie a component body and to underlie the leads, which facilities may be flexed to eject or receive the components.

With these and other objects in view, the present invention contemplates a flexible belt conveyor having spaced transverse slits and transverse slots intersecting the slits to form tabs. The tabs are flexed away from the surface of the belt to expose compartments that receive the components. Leads extending from either side of the components are supported by the surface of the belt. Suitable perforations are provided in the belt that are engageable with a drive mechanism. The tabs are flexed open by running the belt over a cylindrical roller of a small diameter, to either receive or eject the components.

Other objects and advantages of the present invention will be apparent from the following detailed description when considered in conjunction with the accompanying drawings, wherein:

FIG. 1 is a top view of the prefererd embodiment of the belt conveyor constructed in accordance with the principles of the present invention;

FIG. 2 is a side view of the belt conveyor shown in FIG. 1, running over a cylindrical roll to eject a component from the belt;

FIG. 3 is a sectional view taken along line 3—3 of FIG. 1 showing a component with a tab overlying the body portion and leads extending through the slots formed in the belt;

FIG. 4 is a fragmentary sectional view taken along line 4—4 of FIG. 1 showing a component inserted in the belt;

FIG. 5 is a top view of a second embodiment of a flexible belt conveyor;

FIG. 6 is a side view of the conveyor shown in FIG. 5 passing over a cylindrical roll to eject a component from the belt;

FIG. 7 is a perspective view of an electrical component with leads extending from either side;

FIG. 8 is a top view of a third embodiment of a flexible conveyor belt; and

FIG. 9 is a side view of the belt shown in FIG. 8, running over a cylindrical roll to eject a component from the belt.

Referring first to FIG. 7, there is shown an electrical component 10 having a cylindrical body portion 11. Leads 12 and 13 extend from either side of the cylindrical body portion 11. These components may be resistors, capacitors, diodes, transistors, etc., and may also have various different body configurations.

In a preferred embodiment of the invention, FIG. 1, there is shown the flexible belt 14, constructed of plastic, metal, fabric, or other materials that are inherently resilient. In certain manufacturing operations, it may be desirable to provide a belt that is not reusable; thus, the belt may be constructed of flexible cardboard.

Spaced transverse slits 15 are cut into the surface of the belt 14. The slits 15 are centered with respect to the longitudinal axis of the belt 14. A first group of spaced longitudinal slots 16 are cut into the belt 14 and intersect the slits 15 at one end. A second group of spaced longitudinal slots 17 are cut into the belt 14 and intersect the slits 15 at their opposite ends. Both set of slots 16 and 17 are centered with respect to the longitudinal axis of the belt 14 and intersect the slits 15 to form tabs 23 and 24. The tabs 23 and 24 may be flexed away from the belt to expose a compartment or trough 20 for receiving and housing a cylindrical body portion 11 of an electrical component 10. The trough 20 includes a flat medial portion 26 and two angularly bent portions 27 and 28 extending from opopsite sides of the medial portion 26. The resiliency of the belt 14 causes the tabs 23 and 24 to be urged toward the plane of the belt. A first set of transversely spaced semicircular recesses 18 are cut into the belt 14. The recesses 18 intersect the slots 16 to accommodate leads 12 of electrical components 10. A second set of transversely spaced semicircular recesses 19 are cut into the surface of the belt 14. The recesses 19 intersect the slots 17 to accommodate the leads 13 of the electrical components 10. The surface of the belt underlies and urges the leads 12 and 13 upward, while the tabs 23 and 24 urge the cylindrical body portion 11 of the component 10 downward, thus securing each component in its own compartment. The belt 14 has perforations 21 punched into the surface to accommodate a suitable driving mechanism such as a sprocket wheel (not shown).

In general, the electrical component 10 is inserted into a flexible belt conveyor 14 by running the belt over a cylindrical roll 22 and thereby flexing tabs 23 and 24 away from the surface of the belt. With the tabs 23 and 24 flexed away from the surface of the belt 14, an aperture, compartment or trough 20 is exposed which receives the component 11. The leads 12 and 13 lie on the belt and are supported thereby. When the belt 14 is straightened, the tabs 23 and 24 are flexed towards belt 14 and overlie the component body portion 11. With the belt 14 underlying the leads 12 and 13, and the tabs 23 and 24 overlying the body portion 11 of the component 10, there is a cooperation of structure that holds the component 10 firmly positioned in the belt.

In FIG. 2, the belt 14 is shown passing under a cylindrical roller 22. As the belt 14 progresses around the roller 22, the tabs 23 and 24 are flexed open. When the belt 14 reaches its lowest point in travel, the component 10 is released and ejected. Similarly, if the belt 14 were run over the roller 22, the tabs 23 and 24 would be flexed away from the belt, exposing compartments within the belt for receiving the components 10.

A second embodiment of a flexible conveyor is shown in FIG. 5. In this instance, a conveyor belt 114 has spaced transverse slits 115 cut into the belt. A first set of spaced transverse slots 116 are cut into the belt 114 and intersect the transverse slits at one end. A second set of spaced transverse slots 117 are cut into the belt and intersect the slits 115 at their opposite ends. The intersection of the slots 116 and 117 with the slits 115 form shortened tabs 123 and 124 that overlie the body portion 11 of a component 10. The slots 116 have semicircular recesses 118 formed in both ends. The slots 117 have semicircular recesses 119 formed on both ends. The recesses 118 and 119 afford increased flexibility to the tabs 123 and 124 and accommodate and accurately position the leads 12 and 13 of the components 10.

As in the preferred embodiment of the belt conveyor, the tabs 123 and 123 are flexed away from the surface of the belt 114 by passing the belt over cylindrical roller 122 as shown in FIG. 6. The tabs 123 and 124, when flexed away from the belt, expose compartments or a trough 120 similar to trough 20, FIG. 3, into which are inserted or from which are ejected the components 10. The trough 120 includes a flat medial portion 126 and two angularly bent portions 127 and 128 extending from opposite sides of the medial portion 126. When the components 10 are inserted in the belt, the tabs 123 and 124 overlie the cylindrical body portions 11 and the belt underlies the leads 12 and 13 of the components 10. The leads 12 and 13 extend through the slots 116 and 117, respectively, and the recesses 118 and 119 accommodate the leads. The belt 114 has perforations 121 cut on the surface of the belt to accommodate a drive mechanism such as a sprocket wheel (not shown).

In a third embodiment of the conveyor, FIG. 8, there is shown a belt 214 having spaced transverse slits 215 formed in the belt. A first set of transversely spaced slots 216 have enlarged triangular portions 226 and angularly intersect the slits 215. A second set of transversely spaced slots 217 have enlarged triangular portions 227 and angularly intersect the slits 215. The angular intersection of the slots 216 and 217 with the slits 215, form a series of tabs 223, 224, and 225. Tabs 223 have holes 228 to afford the tabs increased flexibility. When the components 10 are inserted in the belt, tabs 223 will overlie the cylindrical body portions 11 and tabs 224 and 225 will overlie a portion of the leads 12 and 13.

Semicircular recesses 218 and 219 are cut into the belt and intersect the angular slots 216 and 217 to accommodate the leads 12 and 13 of the components. As in the afore-mentioned embodiments of the belt, the tabs 223, 224, and 225 are flexed away from the surface of the belt 214 by running the belt over a cylindrical roller 222 shown in FIG. 9. With the tabs 223, 224, and 225 flexed upward, a component may either be inserted or ejected from the belt. The belt 214 has perforations 221 cut into the surface of the belt to accommodate a suitable drive mechanism such as sprocket wheels (not shown).

It will be noted that the three embodiments of the conveyor described, are substantially the same in structure, and function in a like manner. Each belt has at least one tab overlying the cylindrical body portion of a component. Each belt has a slotted portion intersecting a slitted portion to form tabs. Each belt has recesses intersecting the slots to accommodate the leads of the components.

It is to be understood that the above-described embodiments of this conveyor as simply illustrative of an application of the principles of the invention and many other modifications may be made without departing from the spirit and scope of the invention.

What is claimed is:
1. A conveyor for electrical components having cylindrical body portions and leads extending from the ends of said body portions comprising a flexible strip having spaced pairs of recesses, slots intermediate and angularly intersecting said recesses, and having enlarged triangular portions, and said belt having transverse slits connecting said enlarged triangular portions to form flexible tabs that may be flexed away from said strip to expose compartments to hold said components and to engage the body portions of said components to urge the leads against said belt.

2. A conveyor for components having cylindrical body portions and leads extending from the ends of said body portions comprising a flexible belt having transversely spaced pairs of longitudinal slots and transverse slits interconnecting said longitudinal slots to form tabs to overlie the body portions of said components, and said belt having semicircular recesses formed therein to intersect the slots for accommodating the leads extending from the body portions of said components.

3. A conveyor for components having cylindrical body portions and leads extending from the ends of said body portions comprising a flexible belt having spaced transverse slits substantially shorter in width than said belt and elongated transverse slots intersecting the ends of said slits to form flexible tabs that may be flexed away from said belt to receive the body portions of said components, said belt having recesses formed therein that intersect said slots to accommodate said leads, and said belt having spaced perforations for engaging a drive mechanism.

4. A conveyor for a component having a body portion with leads extending from either side comprising a belt having a transverse slit and triangular slots intersecting said slit to form a tab to overlie said body portion, said belt having slots angularly intersecting said triangular slots to form tabs to overlie the leads of said component, and said belt having recesses intersecting the ends of said slots to accommodate leads extending through said slots.

5. A conveyor for a component having a body portion and leads extending from the ends of said component, comprising:
  a flexible belt having in cross-section a flat medial portion and angularly bent portions extending from both edges of the flat portion to form a trough,
  said flat medial portion having a transverse slit extending thereacross,
  said bent portions having a pair of slots, one positioned at each juncture of the flat portion and bent portions, and intersecting the ends of said slit to form tabs in the medial portion for flexure away from the surface of said belt to receive the body portion of said component in the trough; and
  said bent portions also having a pair of recesses, one intersecting each slot, for receiving and constraining the leads.

6. A conveyor for components having body portions and leads extending from the ends of said body portions, comprising:
  a flexible belt having longitudinally spaced transverse slits,
  said belt having a first pair of slots angularly extending from the extremities of each of said slits to form a series of first tabs to overlie the body portions of the components and to urge said leads into engagement with said belt,
  said belt having a second pair of slots formed therein intersecting the first pair of slots for accommodating the leads extending from the body portions of said components and for forming a series of pairs of second and third tabs to overlie and urge the leads into engagement with said belt,
  said tabs having an unweakened base portion of sufficient stiffness to maintain and repeatedly return the tabs to the plane of the belt, and
  bending means for successively flexing in unison the first, second and third tabs away from the plane of the belt to receive and overlie the body portions of the components with the first tab, to receive the leads in the second pair of slots and to overlie the leads with the second and third tabs.

7. A conveyor for components having body portions with a predetermined thickness and leads fixed to and extending from the center of the ends of the body, comprising:
   a flexible belt having transversely extending and longitudinally spaced slits along the medial portion of the belt,
   said belt having bent portions extending from both sides of the medial portion to form a longitudinally extending trough,
   said bent portions having longitudinal slots intersecting either end of the slits to form pairs of tabs to support the body portions in the trough, and
   said bent portions also having recesses intersecting the longitudinal slots and extending outwardly in the cross-section of the trough to a height equal to substantially one half the predetermined thickness of the body so that the leads are received and constrained in the recesses.

8. A conveyor for components having body portions and leads extending from both sides of said body portions, comprising:
   a belt having a generally concave cross-section and a flat medial portion,
   said belt having longitudinally spaced transversely extending slits along the medial portion,
   said belt having elongated transverse slots intersecting and extending from the ends of the slits along the concave cross-section of the belt for receiving and constraining the leads of the components in two dimensions and for forming tabs in the medial portion to constrain the component body portions in a third dimension,
   said tabs having unscored base portions of sufficient stiffness for maintaining the tabs in the plane of the medial portion of the belt and for returning the tabs to that plane after repeated flexure out of the plane,
   said belt having aligned openings spaced along the peripheral surface thereof for facilitating driving of the belt, and
   means for momentarily bending the belt to flex the tabs away from the surface of the belt to receive a component and then return to the plane of the belt to constrain the component in three dimensions.

9. A conveyor for a component having an enlarged cylindrical body portion and wire leads extending from both ends of the body portion, comprising:
   a flexible belt having a transversely extending slit positioned medially on the belt,
   said belt having triangular slots intersecting said slit at either end for forming a first tab to engage and completely overlie said enlarged body portion,
   said belt having transversely spaced slots angularly intersecting said triangular slots for forming second and third tabs to engage and completely overlie a portion of the leads and constrain the components in a plane perpendicular to the plane of the belt, and for receiving the leads and constraining the components in the longitudinal direction, and
   said second and third tabs having longitudinally extending edges spaced slightly further apart than the length of the body portion for engaging and constraining the component in a transverse direction.

References Cited in the file of this patent

UNITED STATES PATENTS 2,845,758    Lowthian _____ Aug. 5, 1958

FOREIGN PATENTS 471,746    Great Britain _____ Sept. 9, 1937